United States Patent
Jang

(10) Patent No.: US 12,417,032 B2
(45) Date of Patent: Sep. 16, 2025

(54) MEMORY FOR IMPROVING PERFORMANCE OF READ RETRY OPERATION, STORAGE DEVICE, AND METHOD FOR OPERATING STORAGE DEVICE

(71) Applicant: SK hynix Inc., Icheon-si (KR)

(72) Inventor: In Jong Jang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 35 days.

(21) Appl. No.: 18/184,873

(22) Filed: Mar. 16, 2023

(65) Prior Publication Data
US 2024/0160357 A1  May 16, 2024

(30) Foreign Application Priority Data
Nov. 14, 2022 (KR) .................. 10-2022-0151157

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC .... G06F 3/0619; G06F 3/0659; G06F 3/0679; G06F 3/0658; G11C 7/04; G11C 16/26; G11C 16/0483
See application file for complete search history.

(56) References Cited

U.S. PATENT DOCUMENTS

| | | | |
|---|---|---|---|
| 9,928,920 B2 | 3/2018 | Kurosawa et al. | |
| 2017/0076810 A1 | 3/2017 | Kurosawa et al. | |
| 2017/0154657 A1* | 6/2017 | Kim | G11C 11/5642 |
| 2019/0354314 A1* | 11/2019 | Hung | G06F 3/0679 |
| 2019/0392907 A1* | 12/2019 | Her | G06F 3/0659 |
| 2020/0035307 A1* | 1/2020 | Zeng | G11C 16/28 |
| 2020/0250061 A1* | 8/2020 | Lee | G06F 11/1044 |
| 2021/0064277 A1* | 3/2021 | Lang | G11C 7/1096 |
| 2021/0255781 A1* | 8/2021 | Chae | G06F 3/0613 |
| 2021/0311830 A1* | 10/2021 | Lee | G11C 29/52 |
| 2022/0076765 A1* | 3/2022 | Muchherla | G11C 16/26 |
| 2023/0221872 A1* | 7/2023 | Chen | G11C 29/021 |
| | | | 711/103 |

FOREIGN PATENT DOCUMENTS

| KR | 10-2018-0110412 A | 10/2018 |
|---|---|---|
| KR | 10-2020-0095903 A | 8/2020 |

\* cited by examiner

*Primary Examiner* — Rocio Del Mar Perez-Velez
*Assistant Examiner* — Julian S Mendel

(57) ABSTRACT

A storage device may comprise a memory including a plurality of word lines, a plurality of bit lines, a plurality of memory cells, and a controller. The controller may assess an external environmental state when a read operation on the memory fails and control a read retry operation using at least one of at least two read retry tables that are set for each of at least two attributes of a first sampling factor and each of at least two attributes of a second sampling factor according to the external environmental stat.

17 Claims, 12 Drawing Sheets

| | | Flip Bit | | | | | |
|---|---|---|---|---|---|---|---|
| | | 0 | 10 | 20 | 40 | 80 | 120 |
| Temperature | -35 | RRT0 | RRT1 | RRT2 | RRT3 | RRT4 | RRT5 |
| | -25 | RRT6 | RRT7 | RRT8 | RRT9 | RRT10 | RRT11 |
| | -15 | RRT12 | RRT13 | RRT14 | RRT15 | RRT16 | RRT17 |
| | -5 | RRT18 | RRT19 | RRT20 | RRT21 | RRT22 | RRT23 |
| | 0 | RRT24 | RRT25 | RRT26 | RRT27 | RRT28 | RRT29 |
| | 5 | RRT30 | RRT31 | RRT32 | RRT33 | RRT34 | RRT35 |
| | 10 | RRT36 | RRT37 | RRT38 | RRT39 | RRT40 | RRT41 |
| | 20 | RRT42 | RRT43 | RRT44 | RRT45 | RRT46 | RRT47 |
| | 30 | RRT48 | RRT49 | RRT50 | RRT51 | RRT52 | RRT53 |
| | 40 | RRT54 | RRT55 | RRT56 | RRT57 | RRT58 | RRT59 |
| | 50 | RRT60 | RRT61 | RRT62 | RRT63 | RRT64 | RRT65 |
| | 60 | RRT66 | RRT67 | RRT68 | RRT69 | RRT70 | RRT71 |
| | 70 | RRT72 | RRT73 | RRT74 | RRT75 | RRT76 | RRT77 |
| | 80 | RRT78 | RRT79 | RRT80 | RRT81 | RRT82 | RRT83 |
| | 90 | RRT84 | RRT85 | RRT86 | RRT87 | RRT88 | RRT89 |

Search Default

FIG.3

|  |  | Sampling Factor | | | | |
| --- | --- | --- | --- | --- | --- | --- |
|  |  | Attribute 1 | Attribute 2 | Attribute 3 | Attribute 4 | Attribute 5 |
| Temperature | Cold | RRT0 | RRT1 | RRT2 | RRT3 | RRT4 |
|  | Room | RRT5 | RRT6 | RRT7 | RRT8 | RRT9 |
|  | Hot | RRT10 | RRT11 | RRT12 | RRT13 | RRT14 |

| | | Sampling Factor | | | | |
|---|---|---|---|---|---|---|
| | | Attribute 1 | Attribute 2 | Attribute 3 | Attribute 4 | Attribute 5 |
| Temperature | Cold | RRT0 | RRT1 | RRT2 | RRT3 | RRT4 |
| | Room | RRT5 | RRT6 | RRT7 | RRT8 | RRT9 |
| | Hot | RRT10 | RRT11 | RRT12 | RRT13 | RRT14 |

Search Default

FIG.6

| | | Flip Bit | | | | | |
|---|---|---|---|---|---|---|---|
| | | 0 | 10 | 20 | 40 | 80 | 120 |
| Temperature | -35 | RRT0 | RRT1 | RRT2 | RRT3 | RRT4 | RRT5 |
| | -25 | RRT6 | RRT7 | RRT8 | RRT9 | RRT10 | RRT11 |
| | -15 | RRT12 | RRT13 | RRT14 | RRT15 | RRT16 | RRT17 |
| | -5 | RRT18 | RRT19 | RRT20 | RRT21 | RRT22 | RRT23 |
| | 0 | RRT24 | RRT25 | RRT26 | RRT27 | RRT28 | RRT29 |
| | 5 | RRT30 | RRT31 | RRT32 | RRT33 | RRT34 | RRT35 |
| | 10 | RRT36 | RRT37 | RRT38 | RRT39 | RRT40 | RRT41 |
| | 20 | RRT42 | RRT43 | RRT44 | RRT45 | RRT46 | RRT47 |
| | 30 | RRT48 | RRT49 | RRT50 | RRT51 | RRT52 | RRT53 |
| | 40 | RRT54 | RRT55 | RRT56 | RRT57 | RRT58 | RRT59 |
| | 50 | RRT60 | RRT61 | RRT62 | RRT63 | RRT64 | RRT65 |
| | 60 | RRT66 | RRT67 | RRT68 | RRT69 | RRT70 | RRT71 |
| | 70 | RRT72 | RRT73 | RRT74 | RRT75 | RRT76 | RRT77 |
| | 80 | RRT78 | RRT79 | RRT80 | RRT81 | RRT82 | RRT83 |
| | 90 | RRT84 | RRT85 | RRT86 | RRT87 | RRT88 | RRT89 |

 Search Default

FIG. 7

| | | Voltage Level | | | | | | |
|---|---|---|---|---|---|---|---|---|
| | | 1.2V | 1.15V | 1.25V | 1.1V | 1.3V | 1.05V | 1.35V |
| Temperature | -35 | RRT0 | RRT1 | RRT2 | RRT3 | RRT4 | RRT5 | RRT6 |
| | -25 | RRT7 | RRT8 | RRT9 | RRT10 | RRT11 | RRT12 | RRT13 |
| | -15 | RRT14 | RRT15 | RRT16 | RRT17 | RRT18 | RRT19 | RRT20 |
| | -5 | RRT21 | RRT22 | RRT23 | RRT24 | RRT25 | RRT26 | RRT27 |
| | 0 | RRT28 | RRT29 | RRT30 | RRT31 | RRT32 | RRT33 | RRT34 |
| | 5 | RRT35 | RRT36 | RRT37 | RRT38 | RRT39 | RRT40 | RRT41 |
| | 10 | RRT42 | RRT43 | RRT44 | RRT45 | RRT46 | RRT47 | RRT48 |
| | 20 | RRT49 | RRT50 | RRT51 | RRT52 | RRT53 | RRT54 | RRT55 |
| | 30 | RRT56 | RRT49 | RRT50 | RRT51 | RRT52 | RRT53 | RRT62 |
| | 40 | RRT63 | RRT55 | RRT56 | RRT57 | RRT58 | RRT59 | RRT69 |
| | 50 | RRT70 | RRT61 | RRT62 | RRT63 | RRT64 | RRT65 | RRT76 |
| | 60 | RRT77 | RRT67 | RRT68 | RRT69 | RRT70 | RRT71 | RRT83 |
| | 70 | RRT84 | RRT73 | RRT74 | RRT75 | RRT76 | RRT77 | RRT90 |
| | 80 | RRT91 | RRT79 | RRT80 | RRT81 | RRT82 | RRT83 | RRT97 |
| | 90 | RRT98 | RRT85 | RRT86 | RRT87 | RRT88 | RRT89 | RRT104 |

 Search Default

|  |  | Usage Type | | |
|---|---|---|---|---|
|  |  | TLC Data Open | TLC Data Closed | TLC GC |
| Temperature | -35 | RRT0 | RRT1 | RRT2 |
|  | -25 | RRT6 | RRT7 | RRT8 |
|  | -15 | RRT12 | RRT13 | RRT14 |
|  | -5 | RRT18 | RRT19 | RRT20 |
|  | 0 | RRT24 | RRT25 | RRT26 |
|  | 5 | RRT30 | RRT31 | RRT32 |
|  | 10 | RRT36 | RRT37 | RRT38 |
|  | 20 | RRT42 | RRT43 | RRT44 |
|  | 30 | RRT48 | RRT49 | RRT50 |
|  | 40 | RRT54 | RRT55 | RRT56 |
|  | 50 | RRT60 | RRT61 | RRT62 |
|  | 60 | RRT66 | RRT67 | RRT68 |
|  | 70 | RRT72 | RRT73 | RRT74 |
|  | 80 | RRT78 | RRT79 | RRT80 |
|  | 90 | RRT84 | RRT85 | RRT86 |

Search Default

|  |  | Usage Type | | |
|---|---|---|---|---|
|  |  | SLC Data Open | SLC Data Closed | SLC GC |
| Temperature | -35 | RRT0 | RRT1 | RRT2 |
|  | -25 | RRT6 | RRT7 | RRT8 |
|  | -15 | RRT12 | RRT13 | RRT14 |
|  | -5 | RRT18 | RRT19 | RRT20 |
|  | 0 | RRT24 | RRT25 | RRT26 |
|  | 5 | RRT30 | RRT31 | RRT32 |
|  | 10 | RRT36 | RRT37 | RRT38 |
|  | 20 | RRT42 | RRT43 | RRT44 |
|  | 30 | RRT48 | RRT49 | RRT50 |
|  | 40 | RRT54 | RRT55 | RRT56 |
|  | 50 | RRT60 | RRT61 | RRT62 |
|  | 60 | RRT66 | RRT67 | RRT68 |
|  | 70 | RRT72 | RRT73 | RRT74 |
|  | 80 | RRT78 | RRT79 | RRT80 |
|  | 90 | RRT84 | RRT85 | RRT86 |

Search Default

|  |  | Mode | |
|---|---|---|---|
|  |  | DDR | SDR |
| Temperature | -35 | RRT0 | RRT1 |
|  | -25 | RRT2 | RRT3 |
|  | -15 | RRT4 | RRT5 |
|  | -5 | RRT6 | RRT7 |
|  | 0 | RRT8 | RRT9 |
|  | 5 | RRT10 | RRT11 |
|  | 10 | RRT12 | RRT13 |
|  | 20 | RRT14 | RRT15 |
|  | 30 | RRT16 | RRT17 |
|  | 40 | RRT18 | RRT19 |
|  | 50 | RRT20 | RRT21 |
|  | 60 | RRT22 | RRT23 |
|  | 70 | RRT24 | RRT25 |
|  | 80 | RRT26 | RRT27 |
|  | 90 | RRT28 | RRT29 |

Search Default

MEMORY FOR IMPROVING PERFORMANCE OF READ RETRY OPERATION, STORAGE DEVICE, AND METHOD FOR OPERATING STORAGE DEVICE

CROSS-REFERENCE TO RELATED APPLICATION

The present application claims priority under 35 U.S.C. § 119(a) to Korean Patent Application No. 10-2022-0151157 filed in the Korean Intellectual Property Office on Nov. 14, 2022, which is incorporated herein by reference in its entirety.

BACKGROUND

1. Technical Field

Various embodiments generally relate to a memory for improving performance of a read retry operation, a storage device, and a method for operating a storage device.

2. Related Art

A storage device is a device that stores data according to a request from a host such as a computer, a mobile terminal such as a smartphone and a tablet, or various electronic devices.

The storage device may include a controller for controlling a memory (e.g., a volatile memory or a nonvolatile memory) included in the storage device. The controller may receive a command from the host, and may execute or control an operation for reading, writing or erasing data with respect to the memory, consistent with the received command.

When the controller performs an operation for reading data stored in the memory, a problem may occur in which the read operation is not performed normally due to a change in the characteristics of the memory.

SUMMARY

Various embodiments are directed to providing measures capable of improving performance of error correction when a read operation fails, through the setting of read retry tables in consideration of various characteristics.

In an embodiment, a storage device may include: a memory including a plurality of word lines, a plurality of bit lines and a plurality of memory cells; and a controller configured to grasp an external environmental state when a read operation on the memory fails and control a read retry operation using at least one of at least two read retry tables that are set for each of at least two attributes of a first sampling factor and each of at least two attributes of a second sampling factor according to the external environmental state.

In an embodiment, a method for operating a storage device may include: reading a system temperature when a read operation on a memory fails; performing a read retry operation using at least one of at least two read retry tables set for at least two attributes, respectively, of a sampling factor at the system temperature; and setting, when the read retry operation succeeds, a read retry table used when the read retry operation succeeds, as a temporary default read retry table.

In an embodiment, a memory may include: a block configured to store a plurality of read retry tables set for each of a plurality of system temperatures and each of at least two attributes of a sampling factor at each of the plurality of system temperatures.

According to the embodiments of the disclosed technology, since a read retry operation is performed using a plurality of read retry tables set in consideration of various characteristics including system temperature, performance of error correction may be improved when a read operation fails.

BRIEF DESCRIPTION OF THE DRAWINGS

FIG. 3 is a diagram schematically illustrating an example in which a plurality of read retry tables are set in a storage device according to an embodiment of the disclosure.

FIGS. 6 to 10 are diagrams illustrating specific examples in which a plurality of read retry tables are set in a storage device according to embodiments of the disclosure.

DETAILED DESCRIPTION

Hereinafter, embodiments of the disclosed technology will be described in detail with reference to the accompanying drawings.

Figure 1:
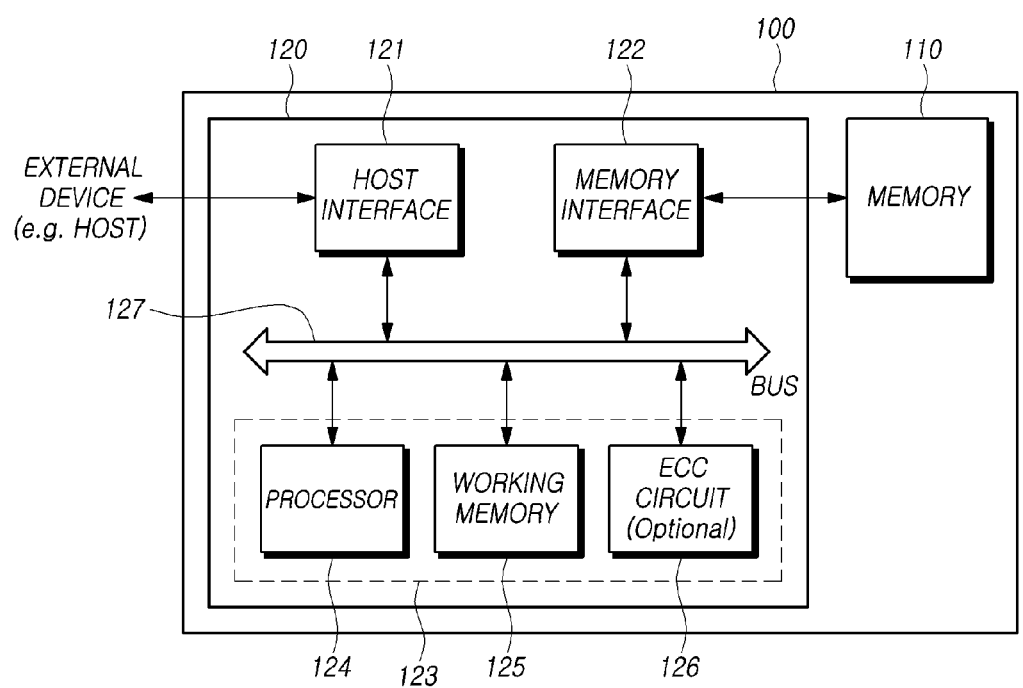
FIG. 1 is a schematic configuration diagram of a storage device according to an embodiment of the disclosure.

FIG. 1 is a schematic configuration diagram of a storage device according to an embodiment of the disclosure.

Referring to FIG. 1, a storage device 100 may include a memory 110 that stores data, and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells"), which store data. Such a memory cell array may exist in a memory block.

For example, the memory 110 may be implemented into various types such as a NAND flash memory, a 3D NAND flash memory, a NOR flash memory, a resistive random access memory (RRAM), a phase-change random access memory (PRAM), a magnetoresistive random access memory (MRAM), a ferroelectric random access memory (FRAM) and a spin transfer torque random access memory (STT-RAM).

The memory 110 may be implemented into a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area that is selected by the address in the memory cell array. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. Also, the controller 120 may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) capable of driving under human control or autonomous driving, etc.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be implemented by being integrated into one device. Hereafter, for the sake of convenience in explanation, embodiments will be described with the controller 120 and the host separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one among various interface protocols such as a USB (Universal Serial Bus) protocol, an MMC (multimedia card) protocol, a PCI (Peripheral Component Interconnection) protocol, a PCI-E (PCI-express) protocol, an ATA (Advanced Technology Attachment) protocol, a serial-ATA protocol, a parallel-ATA protocol, an SCSI (Small Computer System Interface) protocol, an ESDI (Enhanced Small Disk Interface) protocol, an IDE (Integrated Drive Electronics) protocol, an SMBus (System Management Bus) protocol, an I2C (Inter-Integrated Circuit) protocol, an I3C (Improved Inter-Integrated Circuit) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may selectively include an error detection and correction circuit (ECC circuit) 126.

The processor 124 may control the general operation of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate it into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, embodiments of an operation of the storage device 100 will be described as implemented in such a way that the processor 124 executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL) which serves to analyze a command requested to the storage device 100 from the host and transfer the command to the flash translation layer (FTL); and a flash interface layer (FIL) which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 to generate a command or a signal, according to a result of performing the logic calculation defined in the firmware. When a part of firmware, in which a logic calculation to be performed is defined, is not loaded in the working memory 125, the processor 124 may generate an event (e.g., an interrupt) for loading the corresponding part of the firmware in the working memory 125.

The processor 124 may load metadata necessary for driving firmware, from the memory 110. The metadata, as data for managing the memory 110, may include management information on user data stored in the memory 110.

Firmware may be updated while the storage device 100 is manufactured or while the storage device 100 is executed. The controller 120 may download new firmware from the outside of the storage device 100 and update existing firmware with the new firmware.

The working memory 125 may store firmware, a program code, a command and data that are necessary to drive the controller 120. A working memory 125 may be, for example, a volatile memory that includes at least one among an SRAM (static RAM), a DRAM (dynamic RAM) and an SDRAM (synchronous DRAM).

The error detection and correction circuit 126 may detect an error bit of target data and correct the detected error bit, by using an error correction code. The target data may be, for example, data stored in the working memory 125 or data read from the memory 110.

The error detection and correction circuit 126 may be implemented to decode data by using the error correction code. The error detection and correction circuit 126 may be implemented by various code decoders. For example, a decoder that performs unsystematic code decoding or a decoder that performs systematic code decoding may be used.

For example, the error detection and correction circuit 126 may detect an error bit by the unit of a set sector in each of read data. Each read data may be constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not by the unit of a sector. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. When a sector included in read data is correctable, the error detection and correction circuit 126 may omit an error detection and correction operation for a corresponding sector for next read data. When the error detection and correction operation for all read data is ended in this way, the error detection and correction circuit 126 may detect a sector which is determined to be uncorrectable. There may be one or more sectors that are determined to be uncorrectable. The error detection and correction circuit 126 may transfer information (e.g., address information) on a sector which is determined to be uncorrectable, to the processor 124.

A bus 127 may be configured to provide channels among the components 121, 122, 124, 125 and 126 of the controller 120. The bus 127 may include, for example, a control bus for transferring various control signals, commands and the likes, a data bus for transferring various data, and so forth.

Some of the components among the above-described components 121, 122, 124, 125 and 126 of the controller 120 may be omitted, or some of the components among the above-described components 121, 122, 124, 125 and 126 of the controller 120 may be integrated into one component. In other embodiments, one or more other components may be added in addition to the above-described components 121, 122, 124, 125 and 126 of the controller 120.

Hereinbelow, the memory 110 will be described in further detail with reference to FIG. 2.

Figure 2:
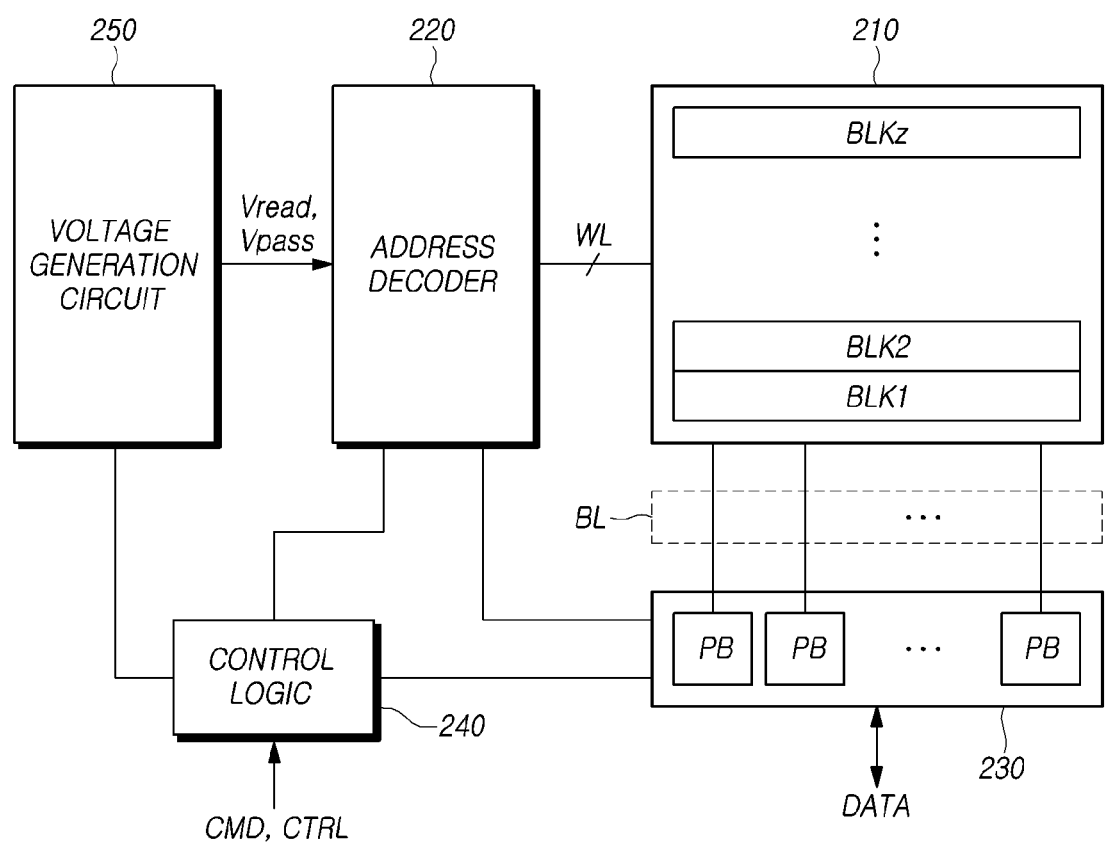
FIG. 2 is a block diagram schematically illustrating a memory of FIG. 1.

FIG. 2 is a block diagram schematically illustrating a memory of FIG. 1.

Referring to FIG. 2, a memory 110 according to an embodiment of the disclosure may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells (MC). For example, the plurality of memory cells (MC) may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells (MC) included in the memory cell array 210 may store data of at least 1 bit. For instance, each of the plurality of memory cells (MC) included in the memory cell array 210 may be a signal level cell (SLC) that stores 1-bit data. In another instance, each of the plurality of memory cells (MC) included in the memory cell array 210 may be a multi-level cell (MLC) that stores 2-bit data. In still another instance, each of the plurality of memory cells (MC) included in the memory cell array 210 may be a triple level cell (TLC) that stores 3-bit data. In yet another instance, each of the plurality of memory cells (MC) included in the memory cell array 210 may be a quad level cell (QLC) that stores 4-bit data. In a further instance, the memory cell array 210 may include a plurality of memory cells (MC) each of which stores 5 or more-bit data.

The number of bits of data stored in each of the plurality of memory cells (MC) may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block according to the decoded block address.

The address decoder 220 may receive a read voltage Vread and a pass voltage Vpass from the voltage generation circuit 250.

In a read voltage applying operation, during a read operation the address decoder 220 may apply the read voltage Vread to a selected word line WL in a selected memory block, and may apply the pass voltage Vpass to the remaining unselected word lines WL.

In a program verify operation, the address decoder 220 may apply a verify voltage generated in the voltage generation circuit 250 to a selected word line WL in a selected memory block, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line WL depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes the plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. In a read operation and a program verify operation, the plurality of page buffers PB may continuously supply sensing current to bit lines BL coupled with memory cells to sense threshold voltages (Vth) of the memory cells, and may latch sensing data by sensing, through sensing nodes, changes in amounts of current flowing according to the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line WL more adjacent to the read and write circuit 230 between two outermost word lines WL, and a second select line (also referred to as a drain select line or a source select line) may be additionally disposed outside a second outermost word line WL between the two outermost word lines WL.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

In a read operation for the memory 110, the read operation by a preset read voltage Vread may not be performed in a normal manner due to a change in the characteristics of a memory cell. As a result, a read operation may be performed by changing the read voltage Vread.

A read operation performed by changing the read voltage Vread may be referred to as a read retry operation. The level of read voltage Vread used in the read retry operation may be provided in the form of, for example, a read retry table (RRT).

Embodiments of the disclosed technology may provide a plurality of read retry tables (RRT) that are set in consideration of various characteristics of the memory 110. Embodiments of the disclosed technology may perform a read retry operation using a plurality of preset read retry tables (RRT), thereby improving performance of error correction when a read operation fails.

Figure 4:
FIGS. 4 and 5 are diagrams exemplarily illustrating a way in which a read retry operation is performed using a plurality of read retry tables set in the storage device according to an embodiment of the disclosure.
Figure 5:

FIG. 3 is a diagram schematically illustrating an example in which a plurality of read retry tables RRT are set in a storage device according to an embodiment of the disclosure. FIGS. 4 and 5 are diagrams exemplarily illustrating a way in which a read retry operation is performed using a plurality of read retry tables RRT set in a storage device according to an embodiment of the disclosure.

Referring to FIG. 3, a storage device 100 may include a plurality of read retry tables RRT set for respective types of system temperature.

A system temperature may mean a temperature of the storage device 100. A system temperature may mean a temperature of any one of a memory 110 and a controller 120. A system temperature may mean an internal temperature according to the operation of the storage device 100. A system temperature may be obtained by using a temperature sensor that is included in the storage device 100 or in an electronic device including the storage device 100. A system temperature may be data stored in a register included in the storage device 100 or may be data received from the host.

A system temperature may be classified into at least two types. For example, a system temperature may be classified into a low temperature state Cold, a room temperature state Room and a high temperature state Hot. A plurality of read retry tables RRT may be set for each of the low temperature state, the room temperature state and the high temperature state, respectively. Alternatively, a system temperature may be classified into an extremely low temperature state Extremely Cold, a low temperature state Cold, a room temperature state Room, a high temperature state Hot and an extremely high temperature state Extremely Hot. A way in which a system temperature is classified may be various without being limited to the above examples, and may be provided so that a system temperature may be classified into at least two ranges, with a plurality of read retry tables RRT set for each range.

Each of a plurality of read retry tables RRT set for each of the system temperatures may be set for each of at least two attributes of a sampling factor other than system temperature.

A sampling factor may be any one of various factors other than system temperature that may affect the read voltage Vread during a read operation on the memory 110 included in the storage device 100. Alternatively, a sampling factor may mean at least two among various factors that may affect the read voltage Vread.

A read retry table RRT may be set for a type of system temperature and each of at least two attributes of a sampling factor. In embodiments of the disclosed technology, system temperature may be regarded as a sampling factor. For the sake of convenience in explanation, in the present specification, examples describe a read retry table RRT set for a type of system temperature and each of at least two attributes of a sampling factor other than system temperature. However, it is to be noted that in other embodiments, a read retry table RRT is set for at least two attributes of at least two sampling factors other than system temperature. For example, a read retry table RRT may be set for each of at least two attributes of a first sampling factor and each of at least two attributes of a second sampling factor. One of the first sampling factor and the second sampling factor may be system temperature, and the other may be a factor other than system temperature. Alternatively, both the first sampling factor and the second sampling factor may be factors other than system temperature. The sampling factor as an external environmental state of a system, for example, such as temperature, pressure, current and voltage, may mean one of factors that affect a read operation by the controller 120 of the storage device 100.

In an exemplary case, a read retry table RRT based on the embodiment of the disclosed technology is set for system temperature and a sampling factor other than system temperature. For example in FIG. 3, a zeroth read retry table RRT0 may be set for a low system temperature and a first attribute Attribute 1 of the sampling factor. When a system temperature is a low temperature, the zeroth read retry table RRT0 to a fourth read retry table RRT4 may be set for the first attribute Attribute 1 to a fifth attribute Attribute 5, respectively, of the sampling factor.

A fifth read retry table RRT5 to a fourteenth read retry table RRT14 may be set for respective cases where a system temperature is a room temperature and a high temperature and the first attribute Attribute 1 to the fifth attribute Attribute 5 of the sampling factor. Also, as in the above-described example, when system temperature also includes ranges that are classified into an extremely low temperature and an extremely high temperature, a read retry table RRT may be set for each of the first attribute Attribute 1 to the fifth attribute Attribute 5 of the sampling factor even for a corresponding temperature range.

The zeroth read retry table RRT0 to the fourteenth read retry table RRT14 may be different from each other.

The plurality of read retry tables RRT may be generated through, for example, a process of finding the read voltage Vread while changing a system temperature condition and an attribute of a sampling factor in a process of testing (Built-in self-test BIST) the memory 110.

The plurality of read retry tables RRT may be generated during a test process and may be stored in a specific block of the memory 110.

Since the plurality of read retry tables RRT set for system temperature and attributes of a sampling factor other than system temperature are provided, the storage device 100 may perform a read retry operation using the plurality of read retry tables RRT when a read operation fails.

Referring to FIG. 4, for example, when a read operation on the memory 110 fails, the controller 120 may read a system temperature of the storage device 100.

Alternatively, when a read operation on the memory 110 fails, the controller 120 may first perform a read retry operation using an initial read retry table, which is set as a default read retry table. When the read retry operation using the default read retry table fails, the controller 120 may perform an operation of reading a system temperature. Alternatively, the controller 120 may grasp or assess an external environmental state of a system, and may select a read retry table RRT to be used for a read retry operation, according to the external environmental state. The controller 120 may grasp or assess an external environmental state including at least one of temperature, pressure, current and voltage, and may perform a read retry operation using a read retry table RRT set for a condition of the grasped external environmental state.

In an exemplary case where one of the sampling factors for which read retry tables RRT are set is temperature, the controller 120 may perform a read retry operation using at least one of a plurality of read retry tables RRT set for a read system temperature.

For example, when a system temperature is in a low-temperature state, the controller 120 may perform a read retry operation using at least one of the zeroth read retry table RRT0 to the fourth read retry table RRT4 set for respective attributes of the sampling factor when the system temperature is a low temperature.

The controller 120 may perform a read retry operation by first using a read retry table RRT set as a search default among a plurality of read retry tables RRT set for a case where a system temperature is in a low-temperature state.

For example, the controller 120 may perform a read retry operation by first using the zeroth read retry table RRT0 set for the first attribute Attribute 1. When the read retry operation using the zeroth read retry table RRT0 fails, the controller 120 may perform a read retry operation using the first read retry table RRT1. When the read retry operation using the first read retry table RRT1 does not succeed, the controller 120 may perform a read retry operation sequentially using the second read retry table RRT2, the third read retry table RRT3 and the fourth read retry table RRT4.

The first attribute Attribute 1 set as the search default may be, for example, an attribute value that exerts the least influence on the variation of the read voltage Vread from among attributes of a sampling factor. The first attribute Attribute 1 to the fifth attribute Attribute 5 may have attribute values that exert gradually increasing influence on the variation of the read voltage Vread in that order.

Read retry operations may be sequentially performed by first using a read retry table RRT set for an attribute that exerts little influence on the variation of the read voltage Vread. Since read retry operations are performed using a plurality of read retry tables RRT set for different attributes, the possibility of a failure of a read operation on the memory 110 to be corrected at read retry operation step may increase.

When read retry operations using all of the plurality of read retry tables RRT set for a read system temperature and respective attributes of a sampling factor fail, the controller 120 may end a read retry operation.

In this case, an algorithm step after a read retry operation for correcting a failure of a read operation may proceed.

When a read retry operation using at least one of the plurality of read retry tables RRT set for a read system temperature and respective attributes of a sampling factor succeeds, the controller 120 may end a read retry operation. The controller 120 may set a read retry table RRT used when a read retry operation succeeds, as a temporary default read retry table.

For example, referring to FIG. 5, the controller 120 may perform a read retry operation by first using the zeroth read retry table RRT0. The read retry operation performed by the controller 120 using the zeroth read retry table RRT0 may fail.

The controller 120 may perform read retry operations by sequentially using read retry tables starting from the first read retry table RRT1.

A read retry operation performed by the controller 120 using the first read retry table RRT1 may fail. Thereafter, a read retry operation performed by the controller 120 using the second read retry table RRT2 may fail.

The controller 120 may perform a read retry operation using the third read retry table RRT3.

The read retry operation performed by the controller 120 using the third read retry table RRT3 may succeed. In this case, the controller 120 may set the third read retry table RRT3 as a temporary default read retry table.

If the failure of a read operation occurs later, the controller 120 may perform a read retry operation using the third read retry table RRT3 set as the temporary default read retry table. Since the read operation has failed under conditions or circumstances similar to those of a previous failed read operation, by performing the read retry operation using the third read retry table RRT3 used when a read retry operation performed after the previous failed read operation succeeds, the possibility of the read retry operation to succeed may increase.

When the read retry operation using the third read retry table RRT3 set as the temporary default read retry table fails, the controller 120 may read a system temperature again.

The controller 120 may perform a read retry operation using at least one of a plurality of read retry tables RRT set for the read system temperature. When a read retry operation succeeds, the controller 120 may set a read retry table RRT used when the read retry operation succeeds, as a new temporary default read retry table.

When the entirety of a read operation ends, the controller 120 may reset the initial read retry table set as a basic default read retry table, as a default read retry table. Thereafter, when a restarted read operation fails, the controller 120 may perform a read retry operation by first using the initial read retry table set as the default read retry table.

A plurality of read retry tables RRT may be set for system temperatures and attributes of at least two sampling factors. For example, a plurality of read retry tables RRT may be set for system temperatures and attributes of a first sampling factor. A plurality of read retry tables RRT may be set for attributes of a second sampling factor for each of the attributes of the first sampling factor. The controller 120 may sequentially check a system temperature, an attribute of the first sampling factor and an attribute of the second sampling factor, and may perform a read retry operation using read retry tables RRT set for the three requirements. Alternatively, read retry tables RRT may be set for attributes of at least three sampling factors other than system temperature.

In this way, since a plurality of read retry tables RRT are set for a type of system temperature and respective attributes of a sampling factor other than system temperature, and a read retry operation is performed using the plurality of read retry tables RRT, the possibility of a read retry operation to succeed when a read operation fails may be increased.

Performance of a read retry operation may be improved, and error correction for the failure of a read operation may be possible with minimal workload without performing error correction step after read retry operation step.

Types of system temperature and sampling factors and attributes thereof for which a plurality of read retry tables RRT are set may vary.

FIGS. 6 to 10 are diagrams illustrating specific examples in which a plurality of read retry tables are set in a storage device according to embodiments of the disclosure.

Referring to FIG. 6, a plurality of read retry tables RRT may be set for at least two types of system temperature. At least two read retry tables RRT may be set for each type of system temperature.

The system temperature may be classified into a low temperature, a room temperature and a high temperature as described above, or may be classified into at least two temperature values as in an example shown in FIG. 6. System temperature may be classified into specific temperature values as in the example shown in FIG. 6, or may be classified into specific temperature ranges.

Each of a plurality of read retry tables RRT set for each of system temperatures may be set for each of at least two attributes of a sampling factor. For example, a sampling factor may be the number of flip bits adjusted in the process of detecting a read retry voltage in a test process of the memory 110. In a test process of the memory 110, a read operation may be performed, for example, in a state in which a predetermined number of bits are flipped by a jammer. The number of flip bits may be various, for example, such as 0, 10, 20, 40, 80 and 120.

Since the read operation is performed in a state in which the predetermined number of bits are flipped, a failure of a read operation may occur. Depending on the number of flip bits, that is, depending on a state in which a read operation fails, a required error correction algorithm may be different. Depending on the number of flip bits, a required read voltage Vread may be different. Depending on the number of flip bits, various read retry tables RRT may be set.

The controller 120 may perform a read retry operation using a plurality of read retry tables RRT set for types of system temperature and numbers of flip bits.

When a read operation fails, the controller 120 may perform a read retry operation by using a default read retry table. When the read retry operation fails, the controller 120 may read a system temperature.

The controller 120 may perform a read retry operation by first using a read retry table RRT set for a case where the number of flip bits is 0, among a plurality of read retry tables RRT set for the read system temperature. The case where the number of flip bits is 0 may correspond to a search default.

When the read retry operation using the read retry table RRT set for the case where the number of flip bits is 0 fails, the controller 120 may perform a read retry operation by sequentially using read retry tables RRT set for cases where the number of flip bits is 10, 20, 40, 80 and 120.

The controller 120 may perform a read retry operation using read retry tables RRT set for a system temperature having a smallest difference from the read system temperature among the types of system temperature for which the read retry tables RRT are set.

When there are at least two system temperatures having a smallest difference from the read system temperature, the controller 120 may perform a read retry operation by sequentially using read retry tables RRT set for the at least two system temperatures.

In this case, the controller 120 may perform a read retry operation by first using read retry tables RRT set for a lower temperature between the at least two system temperatures. Alternatively, the controller 120 may perform a read retry operation by first using read retry tables RRT set for a system temperature close to zero between the at least two system temperatures.

A plurality of read retry tables RRT may be set depending on the level of a voltage used to drive the storage device 100.

For example, referring to FIG. 7, a plurality of read retry tables RRT may be set for a type of system temperature. The plurality of read retry tables RRT may be set for respective attributes of a sampling factor. The respective attributes of the sampling factor may be voltage levels.

A voltage level may be any one of voltages used to drive the storage device 100. Alternatively, a voltage level, as the level of a voltage used to generate a voltage for driving the storage device 100, may be the level of a voltage outputted by an LDO (low drop out) included in the storage device 100 and transferred to the memory 110.

The read voltage Vread for the memory 110 may be different depending on the overall level of a voltage supplied to drive the storage device 100.

In the test process of the memory 110, the read voltage Vread may be found by differently adjusting the output voltage of the LDO for each system temperature, and read retry tables RRT may be generated.

A plurality of read retry tables RRT may be set for types of system temperature and voltage levels, and may be stored in the memory 110.

When a read operation fails, the controller 120 may read a system temperature and then may perform a read retry operation by using a plurality of read retry tables RRT set according to voltage levels at the read system temperature. FIG. 7 exemplarily shows an example where a search default is 1.2V.

A plurality of read retry tables RRT may be set for voltage levels whose differences from the search default of 1.2V gradually increase. When a read retry operation using a read retry table RRT derived when a voltage level is 1.2V fails, the controller 120 may perform a read retry operation by sequentially using read retry tables RRT set for voltage levels whose differences from the search default gradually increase, such as 1.15V, 1.25V, 1.1V, 1.3V, 1.05V and 1.35V.

Read retry tables RRT may be set depending on a type or a state of the memory 110.

Figure 8:
Figure 9:

For example, referring to FIGS. 8 and 9, in a structure in which the memory 110 includes triple level cells (TLC) or single level cells (SLC), read retry tables RRT may be set depending on a state of memory cells (MC). This example may be applied even when memory cells (MC) are multi-level cells (MLC) other than triple level cells (TLC).

A usage type may include, for example, a data open state, a data closed state and a garbage collection state. Depending on whether an area on which a read operation is performed is an open block, attributes of a sampling factor may be configured as three attributes as described above.

When a read operation fails, the controller 120 may perform a read retry operation by using a default read retry table. If the read retry operation does not succeed, the controller 120 may read a system temperature, and may perform a read retry operation using a plurality of read retry tables RRT set for the read system temperature.

A search default for the usage type may be, for example, the data open state. The controller 120 may perform read retry operations by sequentially using read retry tables RRT starting from a read retry table RRT set for the data open state among a plurality of read retry tables RRT set for the read system temperature.

Such read retry tables RRT may be generated by a way of finding the read voltage Vread by changing the state of memory cells (MC) in a test process of the memory 110.

Read retry tables RRT may be set depending on a driving mode of the memory 110.

Figure 10:

For example, referring to FIG. 10, a plurality of read retry tables RRT may be set for system temperatures. Each of the plurality of read retry tables RRT may be set for a driving mode of the memory 110. The driving mode of the memory 110 may include, for example, a double data rate DDR and a single data rate SDR.

The memory 110 may be driven at the double data rate DDR or may be driven at the single data rate SDR. Alternatively, the memory 110 may be driven by mixing the two driving modes.

Since a speed at which a read operation is performed is different depending on a driving mode, the read voltage Vread may be different.

In a test process of the memory 110, the drive mode of the memory 110 is set differently for each system temperature, and read retry tables RRT may be generated by finding the read voltage Vread.

When a read retry operation based on a default read retry table fails, the controller 120 may read a system temperature and then perform a read retry operation using a plurality of read retry tables RRT set for the read system temperature. FIG. 10 exemplarily illustrates an example in which the double data rate DDR is set as a search default, but in other examples, the single data rate SDR may be set as the search default.

As such, storage devices 100 based on embodiments of the disclosed technology may include a plurality of read retry tables RRT set for system temperature and at least two attributes of at least one sampling factor other than the system temperature. Since a read retry operation is performed using the plurality of read retry tables RRT set for system temperature and a sampling factor other than the system temperature, performance of the read retry operation may be improved.

Figure 11:
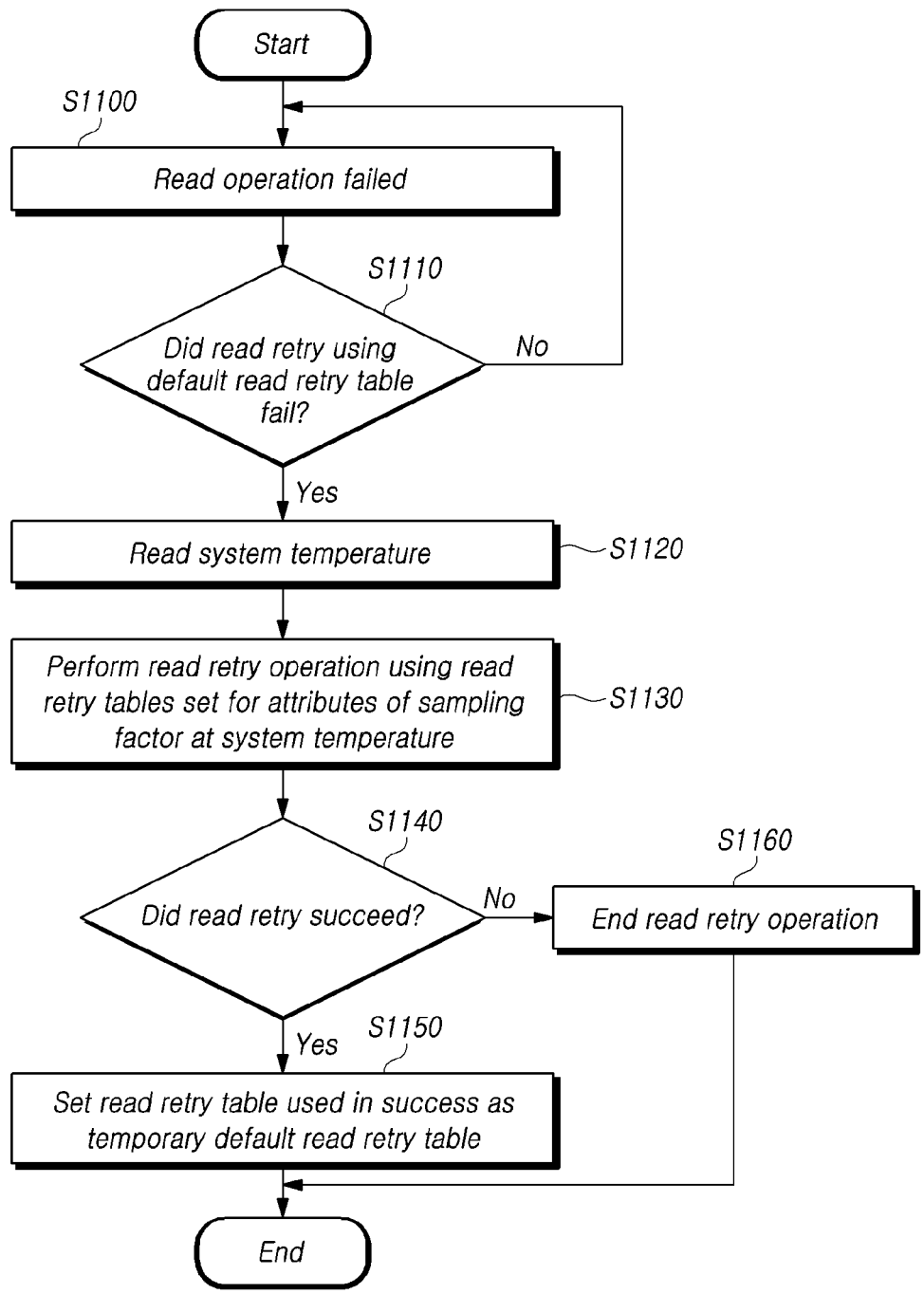
FIGS. 11 and 12 are flowcharts illustrating an example of a method for operating a storage device according to embodiments of the disclosure.
Figure 12:
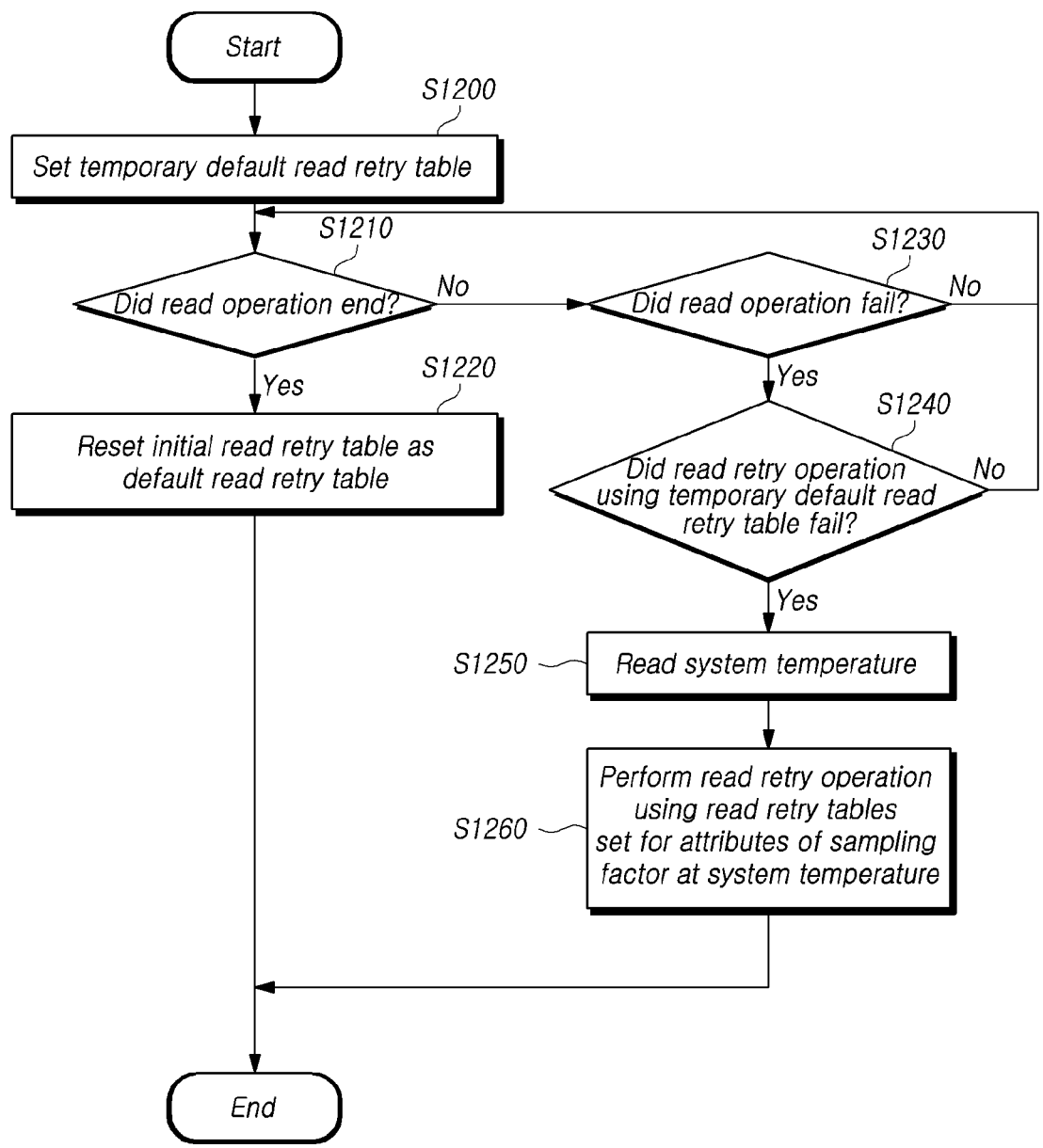

FIGS. 11 and 12 are flowcharts illustrating an example of a method for operating the storage device 100 according to embodiments of the disclosure.

Referring to FIG. 11, a read operation on a memory 110 included in a storage device 100 may fail (S1100).

When the read operation fails, the storage device 100 may perform a read retry operation using a default read retry table. When the read retry operation using the default read retry table fails (S1110), the storage device 100 may read a system temperature (S1120).

The storage device 100 may perform a read retry operation using read retry tables RRT set for attributes of a sampling factor at the system temperature (S1130). The storage device 100 may perform a read retry operation by sequentially using the read retry tables RRT starting from a read retry table RRT set for an attribute set as a search default.

When a read retry operation succeeds by using the plurality of read retry tables RRT set for the system temperature and the attributes of the sampling factor (S1140), the storage device 100 may set a read retry table RRT used when the read retry operation succeeds, as a temporary default read retry table (S1150).

When read retry operations using the plurality of read retry tables RRT set for the read system temperature do not succeed, the storage device 100 may end a read retry operation (S1160). Thereafter, a process for error correction may be performed through another algorithm.

The temporary default read retry table may be used when a read operation subsequently fails.

Referring to FIG. 12, a read retry operation using read retry tables RRT set for a system temperature and at least two attributes of a sampling factor may succeed, and a read retry table RRT used when the read retry operation succeeds may be set as a temporary default read retry table (S1200).

When a read operation ends (S1210), the storage device 100 may reset an initial read retry table as a default read retry table (S1220).

When the read operation does not end (S1210), if a subsequent read operation fails (S1230), then the storage device 100 may perform a read retry operation using the temporary default read retry table.

When the read retry operation performed using the temporary default read retry table fails (S1240), the storage device 100 may read a system temperature (S1250).

The storage device 100 may perform a read retry operation using read retry tables RRT set for attributes of a sampling factor at the read system temperature (S1260).

According to embodiments of the disclosed technology, since a read retry operation is performed by sequentially using read retry tables RRT set for a system temperature and attributes of a sampling factor other than the system temperature, performance of the read retry operation may be improved.

In addition, since a read retry table RRT by which a read retry operation succeeds is set as a temporary default read retry table and the temporary default read retry table is preferentially applied to a subsequent read retry operation, even if a failure of a read operation occurs again, error correction may be performed with minimal workload.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A storage device comprising:
a memory including a plurality of word lines, a plurality of bit lines and a plurality of memory cells; and
a controller configured to determine an external environmental state when a read operation on the memory fails and control a read retry operation using at least one read retry table among a plurality of read retry tables that are set for each of a plurality of attributes of a first sampling factor and each of a plurality of attributes of a second sampling factor according to the external environmental state,
wherein the second sampling factor is a different factor from the first sampling factor, and
wherein the first sampling factor or the second sampling factor corresponds to numbers of flip bits used when the plurality of read retry tables are generated.

2. The storage device according to claim 1, wherein the external environmental state includes at least one of values according to a temperature, a pressure, a current and a voltage.

3. The storage device according to claim 1, wherein the first sampling factor is a temperature, the temperature is read by the controller when the read operation on the memory fails, and at least one of the plurality of read retry tables set for an attribute of the first sampling factor and each of at least two attributes of the second sampling factor according to the temperature is used.

4. The storage device according to claim 1, wherein the controller controls the read retry operation by sequentially using the plurality of read retry tables starting from a read retry table set for an attribute corresponding to a search default.

5. The storage device according to claim 1, wherein, when the read retry operation succeeds, the controller sets a read retry table used among the plurality of read retry tables when the read retry operation succeeds, as a temporary default read retry table.

6. The storage device according to claim 5, wherein, when the temporary default read retry table is set and a new read operation fails, the controller controls the read retry operation using the temporary default read retry table.

7. The storage device according to claim 6, wherein, when the read retry operation using the temporary default read retry table fails, the controller reads a temperature, and controls the read retry operation using at least one of the plurality of read retry tables set for at least two attributes, respectively, of the second sampling factor at an attribute of the first sampling factor according to the temperature.

8. The storage device according to claim 5, wherein, when the read operation on the memory is completed, the controller releases the temporary default read retry table, and resets an initial read retry table as a default read retry table.

9. The storage device according to claim 1, wherein, when the read retry operation using all of the plurality of read retry tables fails, the controller ends the read retry operation.

10. The storage device according to claim 1, wherein at least two attributes of the first sampling factor or the second sampling factor are voltage levels of power used to generate voltages for driving the memory.

11. The storage device according to claim 1, wherein at least two attributes of the first sampling factor or the second sampling factor are both a type and a state of the plurality of memory cells.

12. The storage device according to claim 1, wherein at least two attributes of the first sampling factor or the second sampling factor are driving modes of the plurality of memory cells.

13. A method for operating a storage device, comprising:
reading a system temperature when a read operation on a memory fails;
performing a read retry operation using at least one read retry table among a plurality of read retry tables set for at least two attributes, respectively, of a sampling factor at the system temperature; and
setting a read retry table used when the read retry operation succeeds, as a temporary default read retry table,
wherein the sampling factor is a different factor from the system temperature, and
wherein the sampling factor is numbers of flip bits used when the plurality of read retry tables are generated.

14. The method according to claim 13, further comprising:
performing, when the temporary default read retry table is set and a new read operation fails, the read retry operation using the temporary default read retry table.

15. The method according to claim 13, further comprising:
ending, when the read retry operation using all of the plurality of read retry tables fails, the read retry operation.

16. The method according to claim 13, further comprising:
resetting an initial read retry table as a default read retry table, when the read operation ends.

17. A memory comprising:
a block configured to store a plurality of read retry tables set for each of a plurality of system temperatures and each of at least two attributes of a sampling factor at each of the plurality of system temperatures, and
wherein the sampling factor is a different factor from the system temperature, and
wherein the sampling factor is at least one of numbers of flip bits used when the plurality of read retry tables are generated, voltage levels of power used to generate voltages for driving, a type and a state of a plurality of memory cells, or driving modes of the plurality of memory cells.

* * * * *